United States Patent [19]

Bowen et al.

[11] 4,132,239
[45] Jan. 2, 1979

[54] FLUID VALVE FOR MICROWAVE DEVICES

[75] Inventors: Robert F. Bowen, Burlington; Wesley W. Teich, Wayland, both of Mass.

[73] Assignee: Raytheon Company, Lexington, Mass.

[21] Appl. No.: 813,040

[22] Filed: Jul. 5, 1977

[51] Int. Cl.$^2$ ............... G05D 23/02; H05B 9/00; A47J 31/00
[52] U.S. Cl. ............... 137/382; 236/101 C; 99/305; 219/10.55 D
[58] Field of Search ............ 137/377, 382; 236/93 R, 236/101 E; 219/10.55 E, 10.55 D; 99/283, 306

[56] References Cited

U.S. PATENT DOCUMENTS

| | | | |
|---|---|---|---|
| 2,500,676 | 3/1950 | Hall et al. | 219/10.55 D |
| 2,601,067 | 6/1952 | Spencer | 99/287 |
| 3,351,730 | 11/1967 | Pahlman | 219/10.55 D |
| 3,956,608 | 5/1976 | Imberg et al. | 219/10.55 D |
| 3,972,273 | 8/1976 | Carlson et al. | 99/305 X |
| 4,025,042 | 5/1977 | Doherty et al. | 236/101 C |

Primary Examiner—Martin P. Schwadron
Assistant Examiner—A. Michael Chambers
Attorney, Agent, or Firm—Harold A. Murphy; Joseph D. Pannone; John T. Meaney

[57] ABSTRACT

A fluid valve for utilization in a beverage-making appliance such as a coffee maker subject to microwave energy comprising a valve housing containing the operative parts of the valve, and a metal casing enclosing at least a portion of the housing and having spaced encircling radiation shields between which the adjacent portions of the appliance are disposed, the shields forming a choke to prevent penetration of microwave energy such as could cause arcing and consequent damage to the appliance and to the valve itself.

10 Claims, 5 Drawing Figures

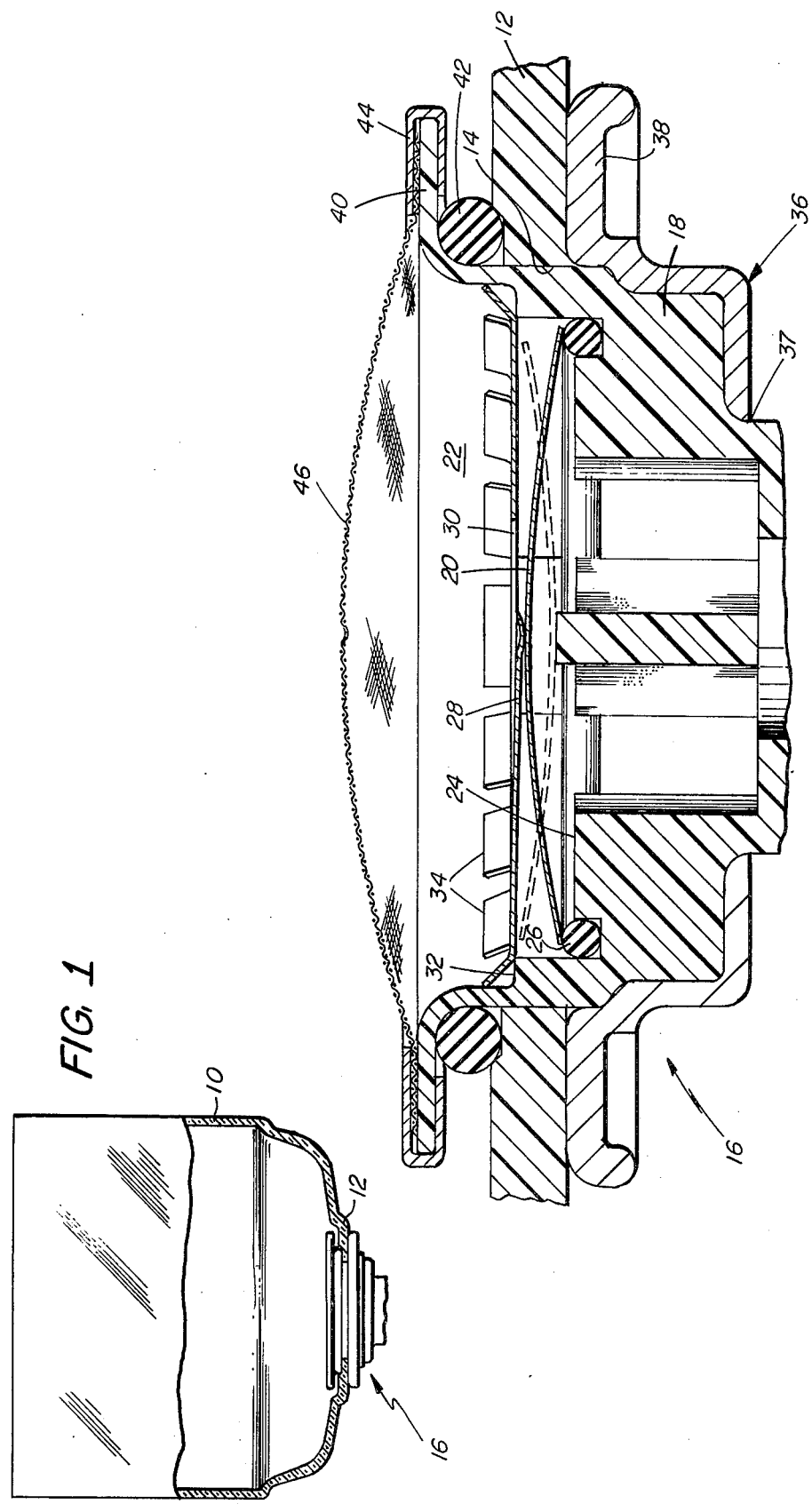

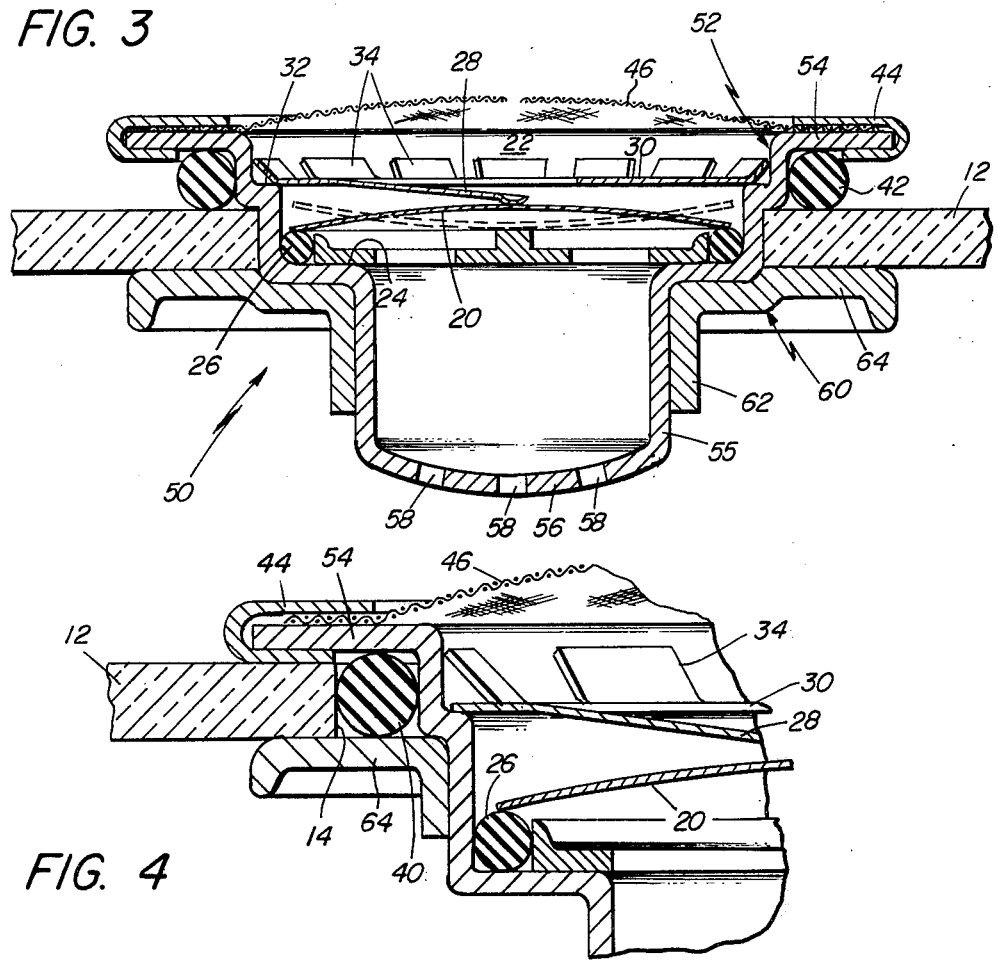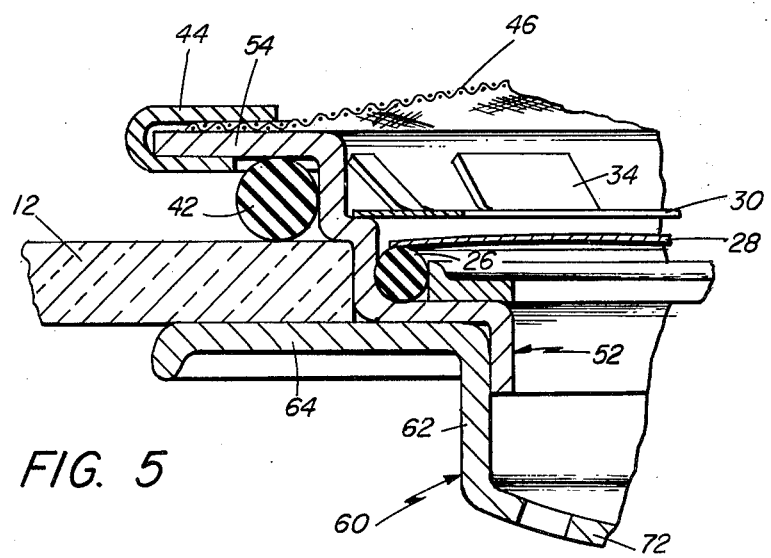

FLUID VALVE FOR MICROWAVE DEVICES

BACKGROUND OF THE INVENTION

In the manufacture of appliances such as hot beverage makers and, more particularly, coffee brewers, it has become desirable to employ microwave energy as the source for heating the fluid used for making the beverage. Such devices require the use of a valve to control the flow of the fluid from one portion of the device to a second portion. Such a valve may be made of a plastic housing containing an actuator of metal, such as a bimetal element, which operates at selected temperature levels. Other valves may be made entirely of plastic or entirely of metal and may be thermally or manually actuated.

One particularly desirable thermally actuated valve for normally heated beverage-making appliances is shown and described in U.S. Pat. Nos. 3,972,273, and 4,025,042. These are valves which utilize a plastic housing containing metal component parts.

It is sometimes desirable, however, to employ all-metal valves. This has in the past proved impractical in microwave devices, however, since metal has produced arcing and other undesirable effects when subjected to microwave radiation, which effects cause considerable damage to the beverage-maker appliance.

SUMMARY OF THE INVENTION

The present invention is directed to an all-metal valve or to a composite metal-plastic valve which can be used in a beverage-making device and subjected to microwave radiation without damage either to the valve or to the device. This is achieved by providing the valve with a metal outer casing which encloses at least a portion of the usual plastic or metal inner valve housing or, in some all-metal valves, may comprise a part of the housing itself.

The casing is provided, according to this invention, with a pair of spaced annular rings extending radially throughout the outer circumference of the device, which rings have rounded edges and form radiation shields which are spaced apart at a selected distance which forms a choke which prevents passage of microwaves. The reservoir or other part of the appliance is provided with an aperture within which the valve is adapted to be located, and the peripheral edge of the material around the aperture is disposed between the shields. The shields thus prevent arcing normally caused by microwave penetration of the valve-reservoir, Consequently, no damage can occur to the reservoir or to the valve by such arcing.

BRIEF DESCRIPTION OF THE DRAWINGS

The above and other objectives of the invention will become apparent from the following description taken in connection with the accompanying drawings wherein FIG. 1 is an elevational view partly in section showing a valve embodying the invention positioned within an aperture in a fluid reservoir or other container;

FIG. 2 is a vertical sectional view of the invention applied to a valve having a plastic housing;

FIG. 3 is a vertical sectional view of the invention applied to an all-metal valve; and FIGS. 4 and 5 are fragmentary vertical sectional views of the invention as used with different valve housings.

DESCRIPTION OF THE PREFERRED EMBODIMENT

Referring more particularly to the drawings, there is shown in FIG. 1 a reservoir 10 or other suitable container which forms a part of a beverage maker or other device. At the bottom of the reservoir 10 is a wall 12 having an aperture 14 in which is disposed a thermally operable fluid valve 16. The device is adapted to be subjected to heat whereupon at a predetermined temperature the valve will open and fluid in the reservoir will flow out of the reservoir through the valve.

When conventional dump-type or other valves of metal are employed in a device of this character, one automatic valve is adapted to be opened when it becomes heated to a predetermined temperature. In other devices the valve is manually opened when the fluid becomes heated. This procedure poses no serious problems when the device is heated by electrical means or by thermal radiation in a conventional oven.

However, when the device is heated in a microwave oven, the metal parts of the valve will arc across sharp corners, when subjected to the microwave radiation. In the presently described valve the microwave radiation is substantially prevented from causing such problems.

Referring to FIG. 2, there is shown a valve of the dump-type comprising a plastic housing 18 containing metal valve parts including a bimetal actuator disc 20. The housing 18 may be any suitable plastic such as a thermosetting synthetic resin, and has a central passage 22 therethrough with an inlet at the top and an outlet at the bottom. At a midpoint internally of the passage 22 the housing is provided with a circumferential shoulder 24 on which rests a resilient O-ring 26 of rubber or plastic. The bimetal disc 20 is normally convex and has its peripheral edge supported on the O-ring 26.

A resilient spring member 28 engages the upper surface of the disc 20, biasing the disc toward the O-ring and holding it in positive seal therewith to prevent fluid in the reservoir above the disc from flowing through the passage 22. Spring member 28 is an arm which is struck from the central portion of a retainer disc 30 which is formed of a resilient flexible material such as spring stainless steel or the like. Disc 30 is seated on a second shoulder 32 and spaced above bimetal disc 20 as shown. The slot in retainer disc 30 resulting from the striking of spring arm 28 serves as an opening through which fluid may flow. The retainer disc 30 is also provided with integral spring tabs 34 spaced at intervals throughout its periphery which resiliently engage the inner walls of the housing to lock the disc 30 in position. Water may also flow between the tabs 34.

At a first predetermined temperature the bimetal disc 20 is automatically abruptly movable over center in a snapping action to the concave configuration shown by dotted lines in FIG. 2. In this second position the marginal area of disc 20 is bowed away from O-ring 26 to permit the flow of liquid through the housing. This disc 20 is automatically reversibly movable from the second curvature position back to the first curvature position to close the valve upon being subjected to a second predetermined temperature.

In accordance with this invention the bottom 12 of the reservoir 10 contains the aperture 14 which fits around the body of the housing 18. Normally this would allow microwaves to penetrate into the seal area and cause arcing such as might destroy parts of the devide. To overcome this problem there is provided a metal casing 36 which encases a portion of the housing 18 beneath the reservoir base or bottom 12. An outwardly turned flange 38 on the upper end of the casing 36 engages the under surface of reservoir base 12 and the outer edge of the flange 38 is rounded so as to provide no sharp edges to prohibit arcing.

The upper end of the plastic housing 18 extends above the reservoir base 12 and has an outwardly directed peripheral flange 40 which overlies the upper surface of the base 12. A resilient O-ring or other gasket 42 is disposed between the flange 40 and adjacent upper surface of the base 12 to provide a fluid seal therebetween.

In accordance with this invention the flange 40 is overlaid with a U-shaped metal channel member 44 which has a rounded large radius outer surface to prevent arcing. The lower metal flange 38 and the metal channel 44 are spaced apart at a predetermined distance which forms a choke through which microwaves cannot pass. Thus, the relatively coextensive flange 38 and channel 44 are radiation shields which prevent damage to the parts of the device. It should be noted that the opening in the bottom of casing 36 must be of the proper diameter to cut off microwaves at the particular frequency at which the device is operated.

A domed screenlike filter 46 is mounted over the top of the valve with its peripheral edge retained between the upper surface of housing flange 40 and the adjacent portion of the channel 44.

Referring to FIG. 3 there is shown an all-metal valve 50 embodying the invention. In valve 50 there is a metal housing 52 having at its upper end an outwardly turned flange 54 which overlies the upper surface of a reservoir base 12. An O-ring 42 is disposed between the flange and the upper surface of the base 12 to provide a fluid seal therebetween. The housing 52 has downwardly extending portion 55 which terminates in an integral transverse portion 56 which is aperturned as indicated at 58. Supported within the housing are the operative parts of the valve, such as those shown in the FIG. 2 embodiment, for example.

Enclosing at least a portion of the circumference of the housing beneath reservoir base 12 is a metal ring 60 having a downturned flange portion 62 fixed by welding or the like to the downwardly extending portion 55 of the housing. The upper portion of the ring is an outwardly directed flange 64 which is disposed against the under surface of the reservoir base 12 with its outer peripheral edge being rounded as shown.

The upper flange 54 of the metal housing 52 and the flange 64 of ring 60 are spaced apart at a distance which prevents penetration by microwaves and thus provide radiation shields which prevent damage to the device.

The structure shown in FIG. 4 is a modification of the all-metal valve shown in FIG. 3 and differs in that the aperture 14 in the reservoir base 12 is larger than the diameter of the housing 52 and an O-ring or other gasket 70 is inserted therebetween. This enables the radiation shields or flanges 54 and 64 to be spaced closer together as a microwave barrier.

In FIG. 5 there is a still further modification of the all-metal valve shown in FIG. 3. In this structure the housing 52 terminates at its seal to the casing 60, while the casing extends downwardly as shown and terminates in an apertured transverse end portion 72.

It will be understood that this invention can be used with any valve structure which is to be utilized in a device subjected to microwave radiation. The operating parts of the valve may be of any selected type and do not in themselves constitute any part of this invention.

From the foregoing it will be apparent that all of the objectives of this invention have been achieved by the valve shown and described. It will also be apparent that various modifications and changes may be made by those skilled in the art without departing from the spirit of the invention as expressed in the accompanying claims. Therefore, all matter shown and described is to be interpreted as illustrative and not in a limiting sense.

What is claimed is:

1. A valve assembly comprising a housing having a passage extending therethrough, thermally actuated means within the housing for opening and closing the passage to flow of a fluid therethrough, the housing having an outer circumferential portion designed to fit within an opening in a wall, and microwave field control means carried by said outer circumferential portion for preventing concentration of electrical fields in the area around said opening.

2. A valve assembly as set forth in claim 1 wherein said field control means are ringlike metal elements without sharp edges spaced for disposition on opposite sides of said wall.

3. A valve assembly for mounting in a wall of a fluid container comprising a housing having a passage extending therethrough, thermally actuated means within the housing for opening and closing the passage to the flow of fluid therethrough, the housing having an outer circumferential portion designed to fit within an opening in said wall, and microwave field control means carried by said housing and spaced for disposal on opposite sides of said wall for preventing concentration of electrical fields in the area of said opening.

4. A valve assembly as set forth in claim 3 wherein said means are a pair of ringlike metal elements spaced on opposite sides of the marginal area of said wall around the aperture.

5. A valve assembly for mounting in a wall of a fluid container transparent to microwaves, comprising a housing having a passage extending therethrough, thermally actuated means within the housing for opening and closing the passage to the flow of fluid therethrough, the housing having an outer circumferential portion designed to fit within an opening in said wall, and a metal casing encircling and fixed to a portion of said housing and having a radial metal flange overlying one side of the marginal area of the wall around the aperture, said housing having a radial metal flange overlying the opposite side of said marginal area of the wall.

6. A valve assembly for mounting in a monmetallic microwave transparent wall of a fluid container comprising a valve housing having a passage extending therethrough, thermally actuated metallic means within the housing for opening and closing the passage to the flow of fluid, said housing having a metal surface for preventing passage of microwaves through the housing to said metallic means, the housing further having an outer circumferential portion shaped to fit within an opening in said wall, and a pair of radially directed metal flanges encircling and carried by said housing and overlying respective opposite surfaces of the marginal areas of said wall around the opening.

7. A valve assembly as set forth in claim 6 wherein said housing is nonmetallic and said metal surface comprises a metal casing disposed over the nonmetallic housing.

8. A valve assembly as set forth in claim 6 wherein said housing is metal.

9. A valve assembly as set forth in claim 6 wherein one of said flanges is integral with said housing, the other flange is a separate member fixed to the housing, and a resilient O-ring seal is disposed between one of the flanges and the adjacent surface of the wall.

10. A valve assembly as set forth in claim 6 wherein said casing flange and said ring have curved outer edges.

* * * * *